US006579409B2

United States Patent
Cullins et al.

(10) Patent No.: US 6,579,409 B2
(45) Date of Patent: Jun. 17, 2003

(54) SEGMENTED COMPLIANT PLATEN FOR FILM SEALING ON INK JET CARTRIDGES

(75) Inventors: Christina Allison Cullins, Lexington, KY (US); Stephen Francis DeFosse, Lexington, KY (US); James Paul Drummond, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 79 days.

(21) Appl. No.: 09/783,226

(22) Filed: Feb. 14, 2001

(65) Prior Publication Data

US 2002/0108719 A1 Aug. 15, 2002

(51) Int. Cl.$^7$ .............................. B30B 15/34; B30B 1/34
(52) U.S. Cl. .............................. 156/583.3; 156/583.91; 156/583.1
(58) Field of Search ...................... 156/583.91, 583.1, 156/583.8, 583.9, 583.3, 581; 100/267, 268

(56) References Cited

U.S. PATENT DOCUMENTS

| | | |
|---|---|---|
| 2,620,427 A | 12/1952 | Mickel |
| 3,067,309 A | 12/1962 | Chinn |
| 3,269,885 A | 8/1966 | Cianci |
| 3,817,172 A | 6/1974 | Horton |
| 4,016,021 A | 4/1977 | La Fleur |
| 4,445,025 A | 4/1984 | Metz |
| 4,641,482 A | 2/1987 | Metz |
| 4,952,777 A | 8/1990 | Kogasaka |
| 5,240,549 A | 8/1993 | Hamburgen et al. |
| 5,632,712 A | 5/1997 | Heinz |
| 5,698,068 A | * 12/1997 | Ichikawa et al. ........... 100/320 |
| 5,910,230 A | * 6/1999 | Seki et al. ................. 156/470 |

FOREIGN PATENT DOCUMENTS

GB    2033296 A    * 5/1980    ........... B29C/27/02

* cited by examiner

Primary Examiner—Richard Crispino
Assistant Examiner—George R Koch, III
(74) Attorney, Agent, or Firm—David E. LaRose; Jacqueline M. Daspit

(57) ABSTRACT

A segmented platen for heat-sealing a film material to a non-planar surface of an ink jet printer cartridge includes a heat-transferring housing having sidewalls defining an internal cavity and a first aperture. Heat-transferring segments, which partially protrude through the first aperture of the housing, are operable to independently move in relation to the housing and each other in a direction substantially parallel to the sidewalls of the housing. Biasing devices, corresponding in number to the segments, independently urge the segments through the first aperture of the housing, thereby urging the segments to follow any curvature in the non-planar surface of the ink jet printer cartridge. The platen further includes a heating element for generating and transferring heat into the housing. The segments receive the heat from the housing, and transfer the heat into the underlying film. Each of the segments of the platen has high thermal conductivity, thereby transferring heat into the film material at a rate much higher than may be attained using compliant rubber platens. The independent movement and downward pressure of the segments upon the film provides efficient heat transfer into the film without deforming high spots in the non-planar surface of the ink jet cartridge.

15 Claims, 6 Drawing Sheets

SEGMENTED COMPLIANT PLATEN FOR FILM SEALING ON INK JET CARTRIDGES

FIELD OF THE INVENTION

The present invention is generally directed to an apparatus for heat-sealing film materials. More particularly, the invention is directed to a platen having a segmented heating surface for heat-sealing a polymer film to an ink jet cartridge.

BACKGROUND OF THE INVENTION

Various configurations of ink-containment vessels, tanks, and print heads for use in ink jet printers incorporate a pressure-regulating device for maintaining optimum ink pressure during operation of the printer. Many of these pressure-regulating devices typically comprise a polymer film covering a precision stainless steel ball disposed in an asymmetrical hole. The film is typically heat-sealed to a surface of the ink tank in order to hold the ball precisely in the hole, thereby forming narrow channels between the ball and the inside of the hole. The film may also cover a vent path in the tank. The ball typically protrudes slightly above the top edge of the hole so that the process of sealing the film over the ball applies a slight normal force to the ball, thereby holding it in a precise location within the hole. The surface to which the film is sealed is typically molded polypropylene or other polymer, or metal.

Due to the geometry and tolerances of the molded or formed tank material, and the geometry of the pressure-regulating device, the surface to which the film is to be sealed is usually not essentially planar. The planarity of the surface may vary by up to 0.2 mm. In the past, rigid platens, such as heated blocks of copper, have been used to heat-seal the film to the non-planar surfaces. Such rigid platens typically cause deformations in high spots of the sealing surface on the tank. This deformation can adversely affect the performance of the vent paths and narrow air channels in the pressure-regulating device.

The use of flexible or elastomeric material having a thickness sufficient to compensate for the non-planarity of the surface to be heated have not proved to be to be completely satisfactory.

Therefore, an improved heat-sealing platen is needed having a compliant heating surface that can accommodate the variations in height of the ink vessel and the pressure-regulating device.

SUMMARY OF THE INVENTION

The foregoing and other needs are met by a segmented platen for transferring heat into a film for heat-sealing the film to a non-planar surface of an ink jet printer cartridge. The platen includes a heat-transferring housing having sidewalls defining an internal cavity and a first aperture. A plurality of heat-transferring segments are disposed substantially within the housing and contacting the sidewalls of the housing. The segments partially protrude through the first aperture of the housing, and each segment has a heating surface disposed outside the cavity. Each of the segments is operable to independently move in relation to the housing and each other in a direction substantially parallel to the sidewalls of the housing. The platen includes a plurality of biasing devices disposed within the housing and corresponding in number to the plurality of heat-transferring segments. Each of the biasing devices independently urges a corresponding one of the segments through the first aperture, such that the heating surface of each segment is thereby urged to follow any curvature in the non-planar surface to which the film is applied when the platen engages the film. A heating element is disposed within the cavity and in contact with the housing. The heating element generates and transfers heat to the housing and the segments.

Thus, the present invention provides a segmented platen having heating surfaces that may move up and down independently of each other to accommodate any non-planarity in the surface to which the film is to be sealed. Each of the segments of the platen have high thermal conductivity, thereby transferring heat into the film material at a rate much higher than may be attained using existing compliant heated rubber platens. The independent movement and downward pressure of the segments upon the film provides efficient heat transfer into the film without deforming the high spots in the non-planar surface.

Preferred embodiments of the platen include a compliant metal shim disposed between the film and the lower heating surfaces of the segments. The shim prevents the edges of the segments from imprinting a grid-like pattern in the film.

In a preferred embodiment, the biasing devices provide differing levels of compressive force to the individual segments depending on the position of the segments within the platen, thereby providing different amounts of pressure to different locations on the film. This position-dependent variation in downward pressure is useful in sealing film over certain types of surface defects or irregularities in an ink jet cartridge, such as sink marks.

In another aspect, the invention provides a platen for heat-sealing a film to a non-planar surface. The platen includes a heating body containing a heating element. The platen also includes a plurality of independently-urgeable elements having non-elastomeric heating surfaces pending from the heating body and contacting the non-planar surface. The platen further includes urging devices corresponding to each of the independently-urgeable elements for urging the independently-urgeable elements toward the non-planar surface.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows.

DETAILED DESCRIPTION OF THE INVENTION

Figure 1:
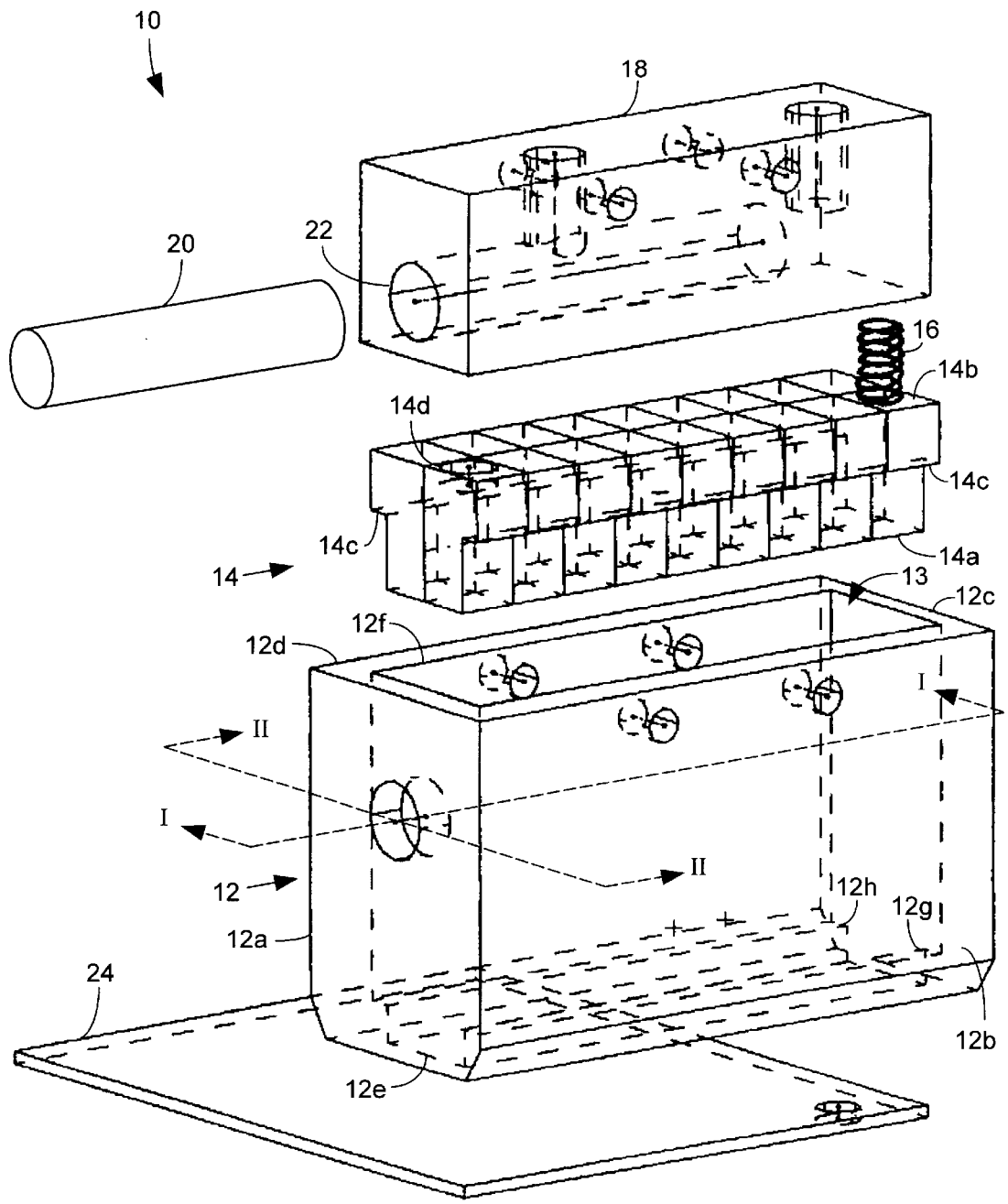
FIG. 1 is an exploded view of a segmented platen according to a preferred embodiment of the invention.

Shown in FIGS. 1–4 is a segmented platen 10 for heat-sealing thermoplastic film materials to non-planar surfaces. The preferred embodiment of the platen 10 includes a rigid heat-transferring housing 12 for enclosing heat-transferring segments 14, biasing devices 16, a heat-transferring block 18, and at least one heater cartridge 20. Each of these components of the platen 10 and their function is described in further detail below.

In typical use, the platen 10 is attached to a positioning device, such as a pneumatic cylinder, that moves the platen 10 into position to seal the film to the sealing surface, and that retracts the platen 10 after the film is sealed. This positioning device provides the normal force that compresses the biasing devices 16, thereby creating the compressive force against the film. The positioning device could also be a spring, a series or combination of springs, or other linear indexing devices.

Figure 3A:
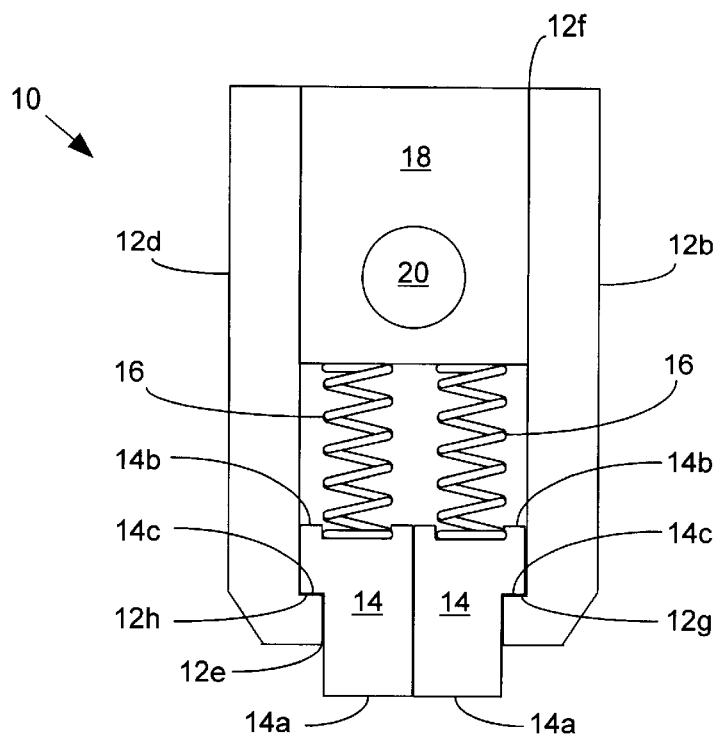
FIG. 3A is a width-wise cross-sectional view of a segmented platen in a fully extended position according to a preferred embodiment of the invention.
Figure 3B:
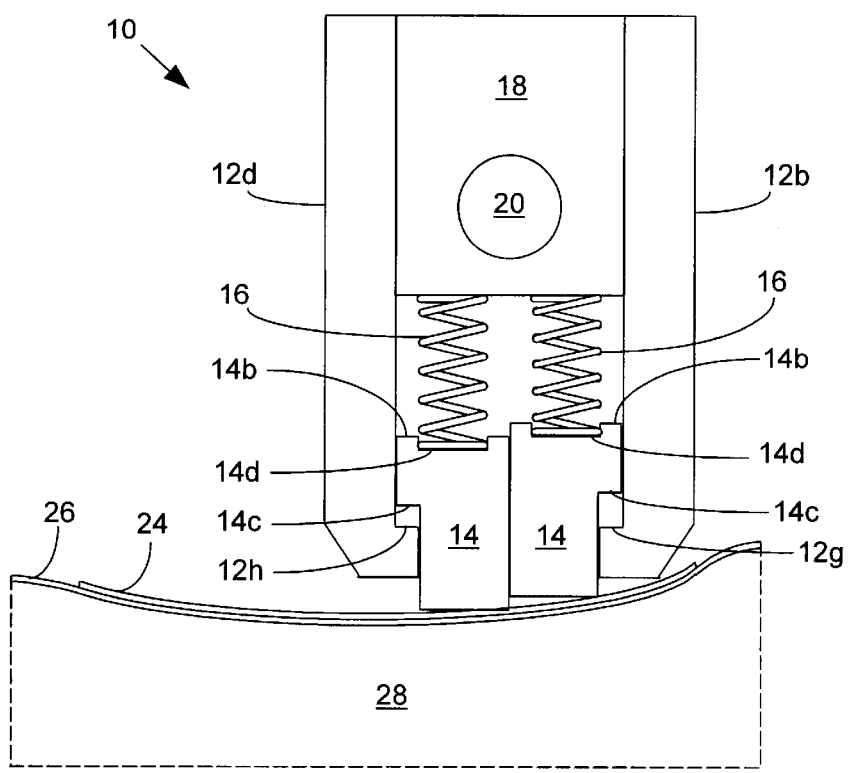
FIG. 3B is a width-wise cross-sectional view of a segmented platen in contact with the shim according to a preferred embodiment of the invention.
Figure 4:
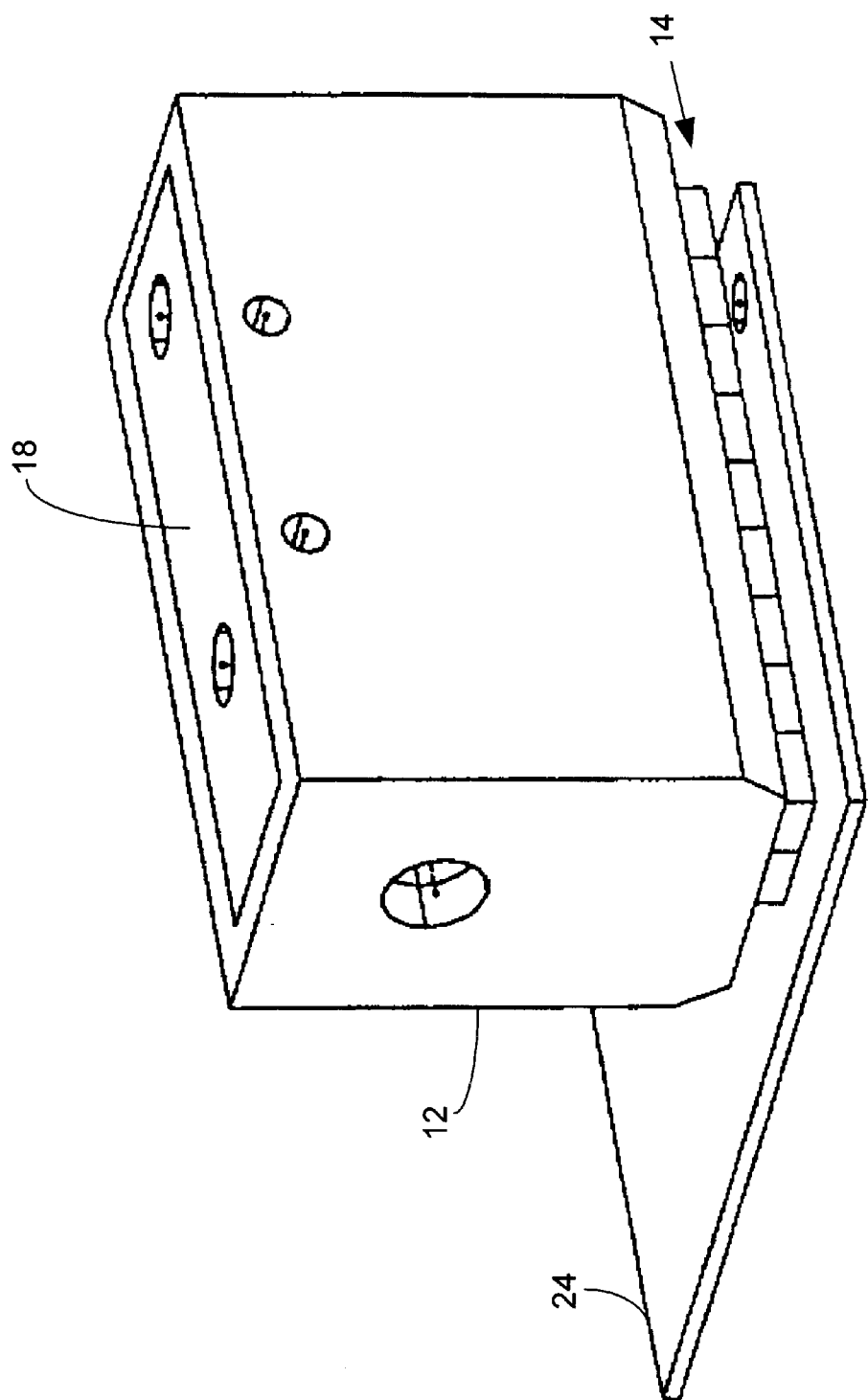
FIG. 4 is a perspective view of a segmented platen according to a preferred embodiment of the invention.

The housing 12 is preferably constructed from a substantially rigid material having a high thermal conductivity, such as brass or copper. The housing 12 is preferably rectangular in cross-section, having four rectangular sidewalls 12a, 12b, 12c, and 12d. The four sidewalls 12a–d have inner surfaces connected together to form a cavity 13 of rectangular cross-section within the housing 12, the cavity 13 opening into upper and first apertures 12e and 12f. As shown in FIGS. 1 and 3A–B, the sidewalls 12b and 12d preferably have projections that form shelves 12g and 12h near the first aperture 12e.

Disposed within the cavity 13 of the housing 12 are a set of heat-transferring segments 14. In the preferred embodiment, the platen 10 includes eighteen adjacently-disposed segments 14, arranged in two parallel rows of nine each. Other numbers of segments 14 could be used, depending upon the size and unevenness of the surface to which the film is to be sealed. Each of the segments 14 is formed from heat-transferring material, such as brass or copper. Each of the segments 14 has a lower heating surface 14a and an opposing top surface 14b. In planes parallel to the lower heating surface 14a, the segments 14 are substantially rectangular in cross-section.

In the preferred embodiment, the lower heating surfaces 14a are substantially flat. In alternative embodiments, the lower heating surfaces 14a are slightly convex or crowned to more closely match the shape of concave or dimpled features in the surface to which the film is to be sealed. In some embodiments of the invention, a thin metal shim, described in more detail hereinafter, is disposed between the surfaces 14a and the sealing surface. In the embodiments including the shim, the convex-shaped lower heating surfaces 14a tend to increase the compliance of the shim which increases the contact area of the lower surface of the shim against the film. This is especially advantageous when there are abrupt discontinuities in the surface to which the film is to be sealed. However, it will be appreciated that the use of convex-shaped heating surfaces 14a would decrease the overall contact area, and would therefore require more heat to seal the film against a relatively flat surface. Therefore, the heating surfaces 14a could be custom-shaped depending on the degree of non-planarity in the surface to which the film is to be sealed.

The size of the segments is determined based upon the size of the film to be sealed. In the preferred embodiment, the lower heating surface 14a of each segment 14 is approximately 5×5 millimeters (25 mm$^2$). A platen 10 having two parallel rows of nine such segments 14 provides for sealing a surface of about 45×10 millimeters (450 mm$^2$).

In the preferred embodiment, the segments 14 each have a shoulder 14c, such that the lower heating surface 14a of each segment 14 is narrower than the top surface 14b. Preferably, the geometry of the shoulders 14c mates with the geometry of the shelves 12g and 12h in the sidewalls 12b and 12d. As shown in FIGS. 3A–B, shelves 12g and 12h contact the shoulders 14c to provide a lower limit of travel of the segments 14 relative to the housing 12. In the top surface 14b of each segment 14 is a bore 14d for receiving and retaining one of the biasing devices 16, such as a spring.

Although the segments 14 contact each other and the sidewalls 12a–d, the dimensions, tolerances, and smoothness of the segments 14 and the housing 12 allow the segments 14 to substantially slide relative to each other and relative to the sidewalls 12a–d in a direction perpendicular to the plane of the first aperture 12e. Thus, the segments 14 may rise and fall with little interaction or undue friction with each other or with the sidewalls 12a–d.

In the preferred embodiment of the invention, the housing 12, the segments 14, and the block 18 are all formed from the same material, or from different materials having substantially the same coefficient of thermal expansion. This preferred design criteria eliminates the possibility that the segments 14 could become either too loose in the housing 12 at elevated temperatures, thereby decreasing the amount of heat transfer from the housing 12 to the segments 14, or that the segments 14 could bind in the housing 12, thereby preventing the desired relative movement between the segments 14 and the housing 12.

The biasing devices 16 are preferably coil springs, although other types of springs, such as wave springs, bevel springs, or leaf springs may also be used. The preferred material for the biasing devices 16 is stainless steel due to its high ratio of modulus to wire diameter. However, it is contemplated that other compliant materials and configurations could be used to form the biasing devices 16, such cylinders or blocks of high-temperature foam.

In the preferred embodiment, the platen 10 includes eighteen biasing devices 16 corresponding to the eighteen segments 14. As shown in FIGS. 2A–B and 3A–B, one end of each biasing device 16 is retained within the bore 14d in the top surface 14b of the associated segment 14. The other end of each biasing device 16 engages the heat-transferring block 18. As the platen 10 is lowered to engage the film 24, each segment 14 provides a downward normal force to the film 24, where the level of downward force corresponds to the compressive force of the biasing device 16 associated with the segment 14.

In the preferred embodiment of the invention, the biasing devices 16 are identical, such that each biasing device 16 provides substantially the same downward force on its associated segment 14 as every other biasing device 16. In an alternative embodiment, biasing devices 16 of differing sizes are used to provide different amounts of downward force on different ones of the segments 14. For example, in one embodiment, biasing devices 16 located toward the center of the platen 10 are designed to provide a greater downward force than biasing devices 16 located toward the ends of the platen 10. Such an embodiment is useful in sealing film over certain types of surface defects, such as sink marks which may result from the injection molding of the ink jet cartridge.

The heat-transferring block 18 is preferably constructed from a rigid material having high thermal conductivity, such as brass or copper. The block 18 is dimensioned to fit snugly within the cavity 13 formed by the sidewalls 12a–d of the housing 12 to maximize heat transfer between the block 18 and the housing 12. Preferably, the block 18 is held securely in the housing 12 by fasteners, such as set screws. The block 18 includes a cavity 22 for receiving one or more heater cartridges 20. As shown in the preferred embodiment of FIG. 1, the cavity 22 is cylindrical. As will be appreciated by one skilled in the art, the cavity 22 could also be rectangular for receiving a rectangular heater cartridge.

As shown in FIG. 1, the preferred heater cartridge 20 is an electrical resistance type cartridge, such as model number TCH0002 manufactured by D-M-E Company of Madison Heights, Mich. The cavity 22 is dimensioned such that the cartridge 20 fits snugly therein, thereby maximizing heat transfer between the cartridge 20 and the block 18.

As the cartridge 20 generates heat, the heat is transferred into the block 18 and then into the housing 12. Contact between the housing 12 and the segments 14 provides for conduction of heat into the segments 14, which then conduct heat into the film 26 for sealing the film 26 to the ink jet cartridge 28. Some heat is also conducted through the biasing devices 16 into the segments 14. The selection of materials having high thermal conductivities for the housing 12, the segments 14, and the block 18, provides for rapid heat transfer from the heater cartridge 20 to the lower surfaces 14a of the segments 14. As mentioned above, the preferred materials for these components are brass or copper. However, one skilled in the art will appreciate that other materials could be used, such as materials having thermal conductivities of no less than about 10 Btu/hr-ft-° F.

As depicted in the Figures, the preferred embodiment of the invention includes a shim 24 for transferring heat from the segments 14 into the film material 26 that is to be heat-sealed to the ink jet cartridge 28. As shown in FIGS. 2A–B and 3A–B, the shim 24 is disposed between the film material 26 and the lower surfaces 14a of the segments 14. The shim 24, which is preferably made from brass, prevents the edges of the lower surfaces 14a of the segments 14 from forming an imprinted pattern in the film 26 or in the surface of the underlying ink jet cartridge material 28. The thickness of the shim 24 is selected so that the shim 24 is able to move in compliance with the motion of the segments 14, but is also being self-supporting in a horizontal position when attached to the housing 12. The preferred thickness of the brass shim 24 that meets these criteria ranges from about 0.05 mm to about 0.15 mm, and is most preferably about 0.10 mm. A preferred embodiment of the invention wherein the shim 24 snaps onto the housing 12 is described in more detail hereinafter.

Figure 2A:
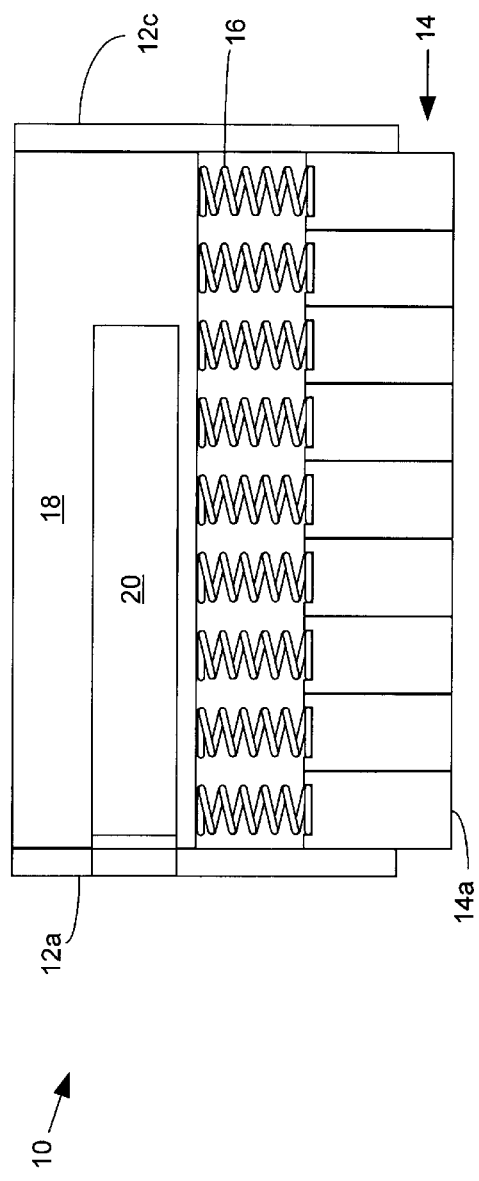
FIG. 2A is a length-wise cross-sectional view of a segmented platen in a fully extended position according to a preferred embodiment of the invention.
Figure 2B:
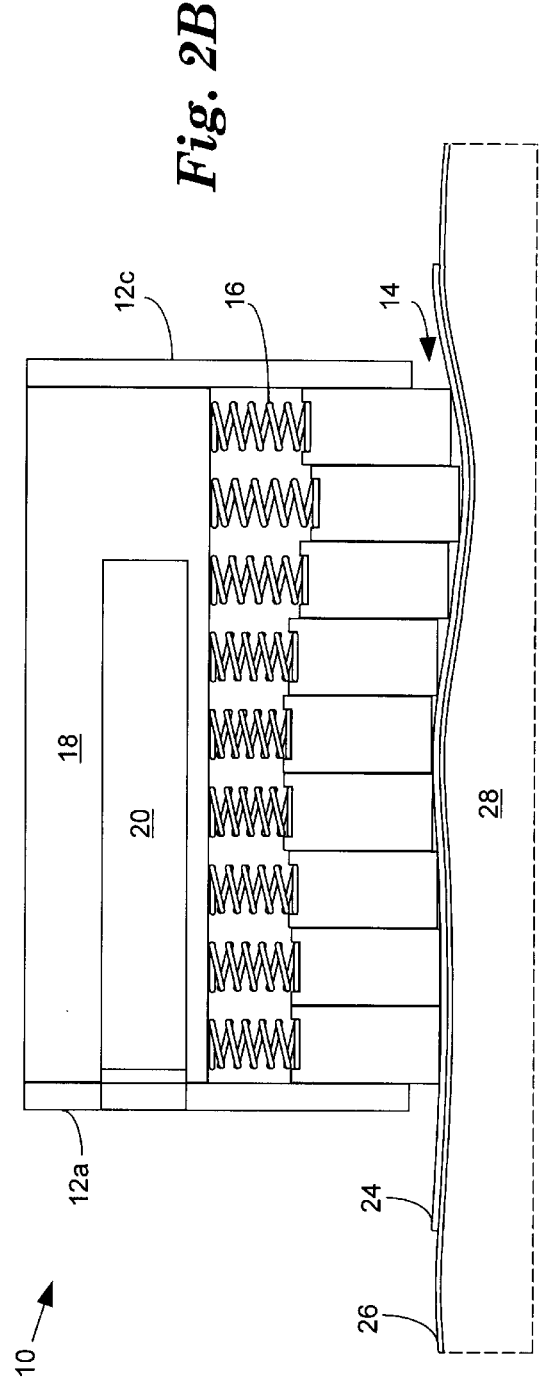
FIG. 2B is a length-wise cross-sectional view of a segmented platen in contact with a shim according to a preferred embodiment of the invention.

FIGS. 2A–B and 3A–B depict width-wise and length-wise cross-sectional views, respectively, of the platen 10, and use of the platen 10 to seal a film 26 to a cartridge 28. The cross-sections of FIGS. 2A–B are taken at section line I—I and the cross-sections of FIGS. 3A–B are taken at section line II—II, as shown in FIG. 1. FIGS. 2A and 3A depict the positions of the segments 14 prior to the platen 10 engaging the film 26. Thus, FIGS. 2A and 3A depict the segments 14 in a fully extended position. In this fully extended position, the biasing devices 16 urge the segments 14 downward such that the shoulders 14c of the segments 14 contact the shelves 12g and 12h in the sidewalls 12b and 12d.

FIGS. 2B and 3B depict the lower surfaces 14a of the segments 14 in contact with the shim 24 while pressing the shim 24 against the film material 26. As shown in FIGS. 2B and 3B, the independent motion of each segment 14 relative to the housing 12, and the independent urging of each biasing device 16 against its associated segment 14, allows the lower surfaces 14a of the segments 14 to move in correspondence to the curvature of the surface of the cartridge 28. In this manner, the amount of surface area of the segments 14 contacting the film 26 is maximized, thereby transferring the maximum amount of heat from the segments 14 into the film 26, while not exerting an excessive amount of force on the high spots in the surface of the cartridge 28. Since the segmented platen 10 does not apply excessive amounts of force on the high spots, the cartridge 28 is not substantially deformed by the platen 10. Thus, the invention offers a significant improvement over rigid platens that may cause significant deformations in a non-planar sealing surface.

The platen 10 also offers significant advantages over existing platens that use rubber to contact and transfer heat into the film material. The higher thermal conductivity of the brass or copper segments 14 and shim 24 allow sealing time to be significantly shorter at a given temperature than would be the case using a rubber platen. For example, experiments have shown that, for the same platen temperatures, the sealing time is approximately 3.5 seconds using the platen 10 compared to about 6.5 seconds for a platen having an elastomeric surface, such as a rubber platen. Alternatively, the sealing time using the platen 10 could be the same as the sealing time using an elastomeric platen, but with the platen 10 operated at a significantly lower temperature. The platen 10 is also more durable than an elastomeric platen, thus requiring less frequent replacement. Because rubber or other elastomeric materials are not used with the platen 10 of the present invention, the platen 10 is less likely to produce volatile compounds that could contaminate the surface of the film 26 being sealed. Due to the relatively large range of movement of the segments 14, leveling of the platen 10 is less critical than with a rubber platen. Due to the lower thermal conductivity of rubber and other such elastomeric materials, a platen containing rubber or another elastomeric material of a thickness sufficient to provide a range of compliance approaching that of the platen 10 would require a heating time for sealing a film to a surface which is substantially greater than the time required using the platen 10.

Figure 5:
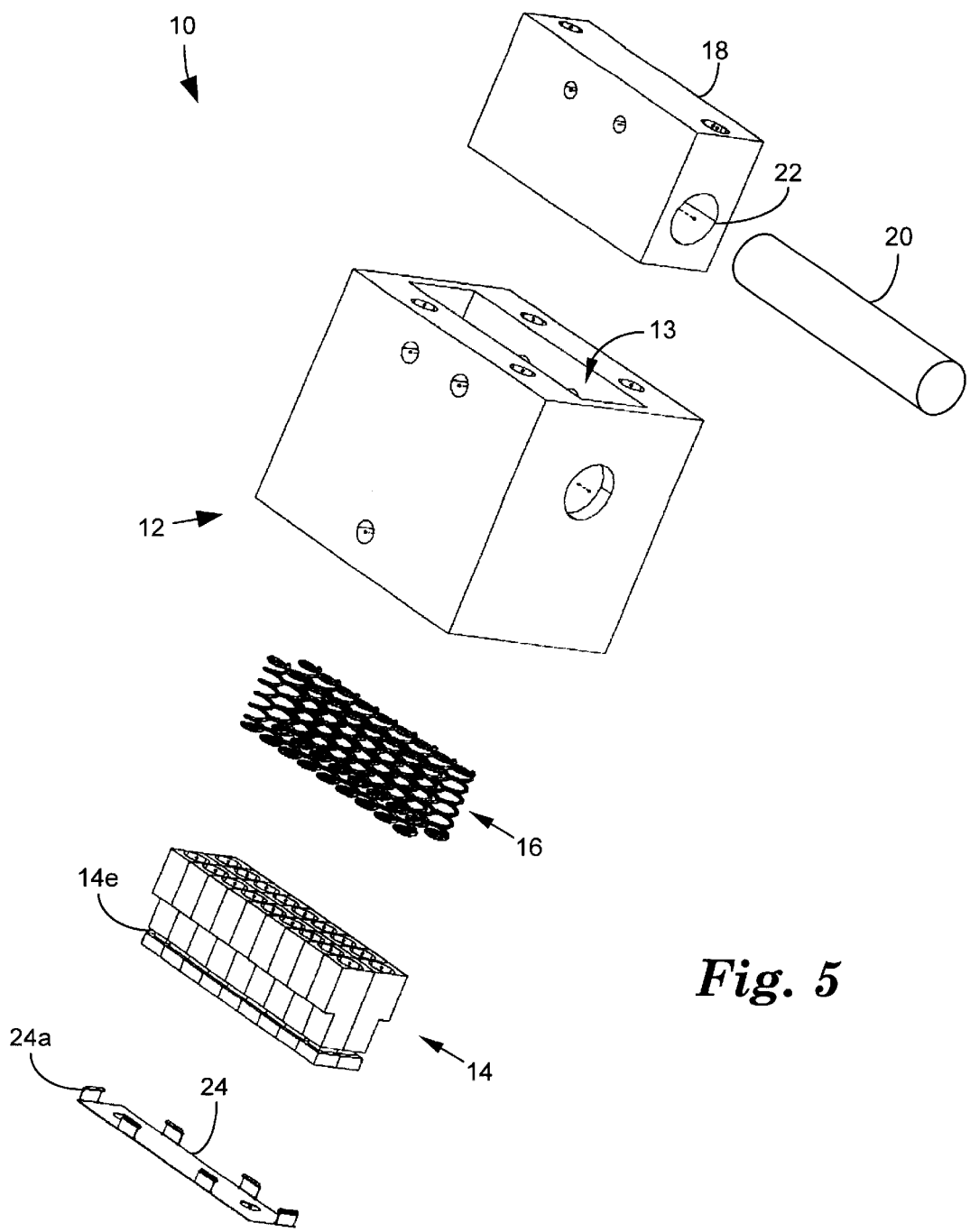
FIG. 5 is an exploded view of a segmented platen with an attachable shim according to an alternate embodiment of the invention.
Figure 6:
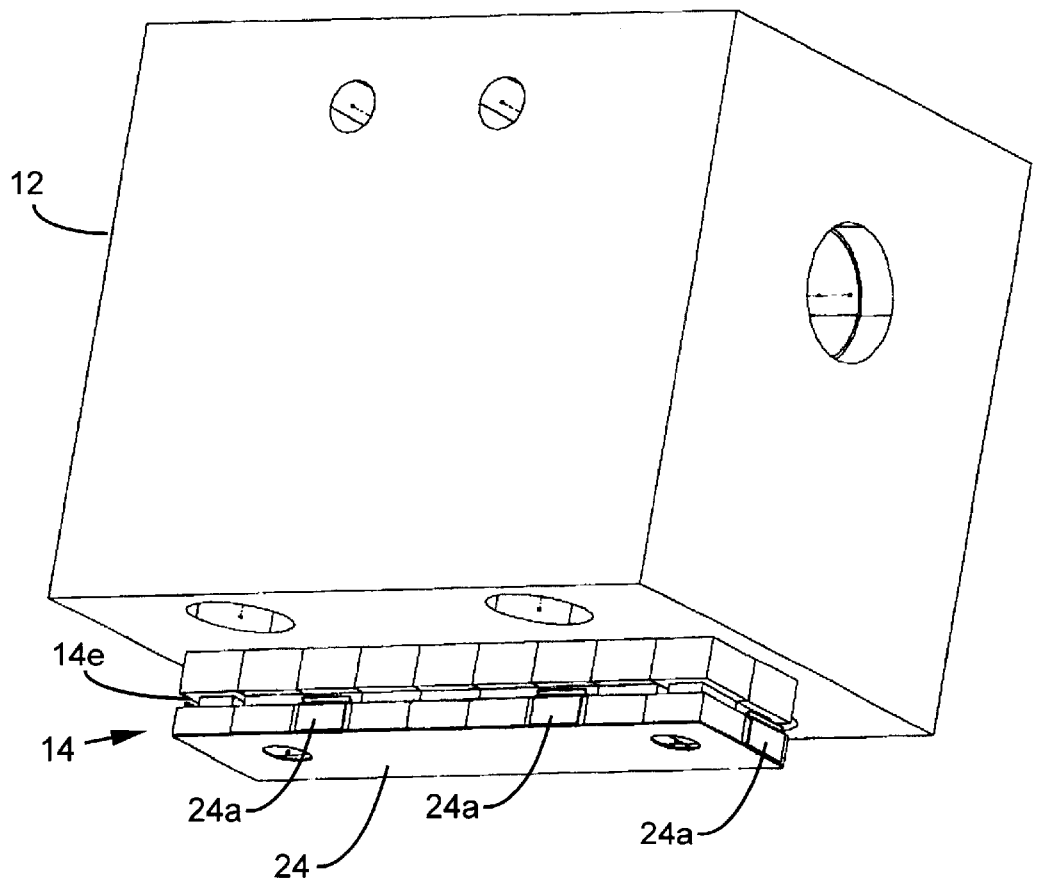
FIG. 6 is a perspective view of a segmented platen with an attachable shim according to an alternate embodiment of the invention.

As depicted in FIGS. 5 and 6, in a most-preferred embodiment of the platen 10, the surface area of the shim 24 approximately matches the combined areas of the heating surfaces of the segments 14. In this embodiment, the shim 24 includes six tabs 24a distributed about the periphery thereof, each having an inward projection. Preferably, as shown in FIGS. 5 and 6, the segments 14 each have a notch 14e for capturing the projections on the tabs 24a of the shim 24 when the shim 24 is pushed into position over the segments 14.

As indicated in FIG. 6, the tabs 24a are preferably positioned so that each tab 24a is substantially centered on a corresponding one of the segments 14 when the shim 24 is snapped into place. This prevents the tabs 24a from interfering with the movement of segments 14 adjacent the segments 14 to which the tabs 24a are attached.

With the embodiment shown in FIGS. 5 and 6, the shim 24 may be removed and replaced, even while the platen 10 is mounted in a production environment. Typically, the shim replacement process may be accomplished in under ten seconds.

It is contemplated, and will be apparent to those skilled in the art from the preceding description and the accompanying drawings that modifications and/or changes may be made in the embodiments of the invention. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. A platen for heat-sealing a film to a non-planar surface of an ink jet printer cartridge, comprising:
   a heat-transferring housing having four sidewalls defining an internal cavity and a first aperture;
   a plurality of heat-transferring segments disposed substantially within the housing and contacting at least two of the sidewalls of the housing, the segments partially protruding through the first aperture of the housing and having a heating surface disposed outside the cavity, each of the segments operable to independently move in relation to the housing and each other in a direction substantially parallel to the sidewalls;
   a plurality of biasing devices disposed within the housing and corresponding in number to the plurality of heat-transferring segments, each of the biasing devices having a first end and a second end, the first end of each biasing device being in contact with a corresponding heat transferring segment, each biasing device independently urging a corresponding one of the segments through the first aperture, such that the heating surface of each segment is thereby urged to follow any curvature in the non-planar surface to which the film is applied when the platen engages the film; and
   a heating element contacting the housing for generating and transferring heat to the housing and the segments, the second end of each biasing device being in direct contact with the heating element.

2. The platen of claim 1 wherein
   the four sidewalls having inner surfaces connected together to form the cavity of rectangular cross-section therebetween, at least one of the sidewalls having a shelf adjacent the first aperture; and
   each of the heat-transferring segments having a top surface opposite the heating surface, and having a shoulder for contacting the shelf in the at least one sidewall, the shoulder interacting with the shelf in the at least one sidewall of the housing to prevent the heating surface of the segment from extending below the first aperture of the housing by more than a predetermined distance.

3. The platen of claim 2 further comprising:
   the heat-transferring housing further comprising two opposing sidewalls that each have a shelf adjacent the first aperture; and
   the plurality of heat-transferring segments aligned in at least two adjacent rows parallel to the inner surfaces of the two opposing sidewalls, the shoulders of the segments interacting with the shelves in the two opposing sidewalls of the housing to prevent the heating surfaces of the segments from extending below the first aperture of the housing by more than the predetermined distance.

4. The platen of claim 2 wherein each of the biasing devices is in compression between the heating element and the top surface of a corresponding one of the segments.

5. The platen of claim 2 further comprising:
   each of the heat-transferring segments having a biasing device-retaining aperture in the top surface; and
   the biasing devices engaging the segments within the biasing device-retaining apertures.

6. The platen of claim 2 wherein adjacent segments may move relative to each other in a direction substantially parallel to the inner surfaces of the sidewalls, but are restrained from moving in directions substantially perpendicular to the inner surfaces of the sidewalls.

7. The platen of claim 2 wherein the heating element comprises:
   a rectangular heat-transferring block disposed within the cavity of the housing, having outer surfaces in intimate contact with the inner surfaces of the housing sidewalls, and having at least one heater cartridge cavity within the rectangular heat-transferring block; and
   at least one heater cartridge disposed within the at least one heater cartridge cavity.

8. The platen of claim 7 wherein the housing, the heat-transferring segments, and the heat-transferring block have thermal conductivities of no less than about 10 Btu/hr-ft-° F.

9. The platen of claim 2 wherein the biasing devices provide differing levels of compressive force to different ones of the segments, the levels of compressive force depending on the position of the segments within the platen, whereby the heating surfaces apply different amounts of pressure to different locations on the film.

10. The platen of claim 1 further comprising a compliant shim disposed between the heating surfaces of the segments and the film, the compliant shim having thermal conductivity of no less than about 10 Btu/hr-ft-° F.

11. The platen of claim 10 wherein the compliant shim is attached to the housing.

12. A platen for heat-sealing a film to a non-planar surface, the platen comprising:
   a rectangular heat-transferring housing having four sidewalls, the four sidewalls connected together to form a cavity of rectangular cross-section therebetween,
   a heating body containing a heating element for heating the heating body, the heating body substantially contained within the cavity defined by the four sidewalls of the rectangular heat-transferring housing and in heat transfer contact with the heat-transferring housing;
   a plurality of independently-urgeable elements having non-elastomeric heating surfaces pending from the heating body for contacting the non-planar surface, the elements being in heat transfer contact with the heating body; and
   biasing devices corresponding to each of the independently-urgeable elements for applying a compressive force to each of the elements and for urging the independently-urgeable elements toward the non-planar surface.

13. The platen of claim 12 wherein each biasing device includes a first end and a second end, the first end of each biasing device coupled to a corresponding urgeable element and the second end of each biasing device being in direct contact with the heating body.

14. The platen of claim 12 further comprising:
   a compliant shim having a thermal conductivity of no less than about 10 Btu/hr-ft-° F. disposed between the independently urgeable elements and the non-planar surface, the shim being attached to the independently urgeable elements.

15. The platen of claim 14 wherein the shim comprises a brass material.

* * * * *